Oct. 6, 1931.  C. J. SHENK  1,825,925
EXPANDING MANDREL
Filed March 29, 1929   2 Sheets-Sheet 1
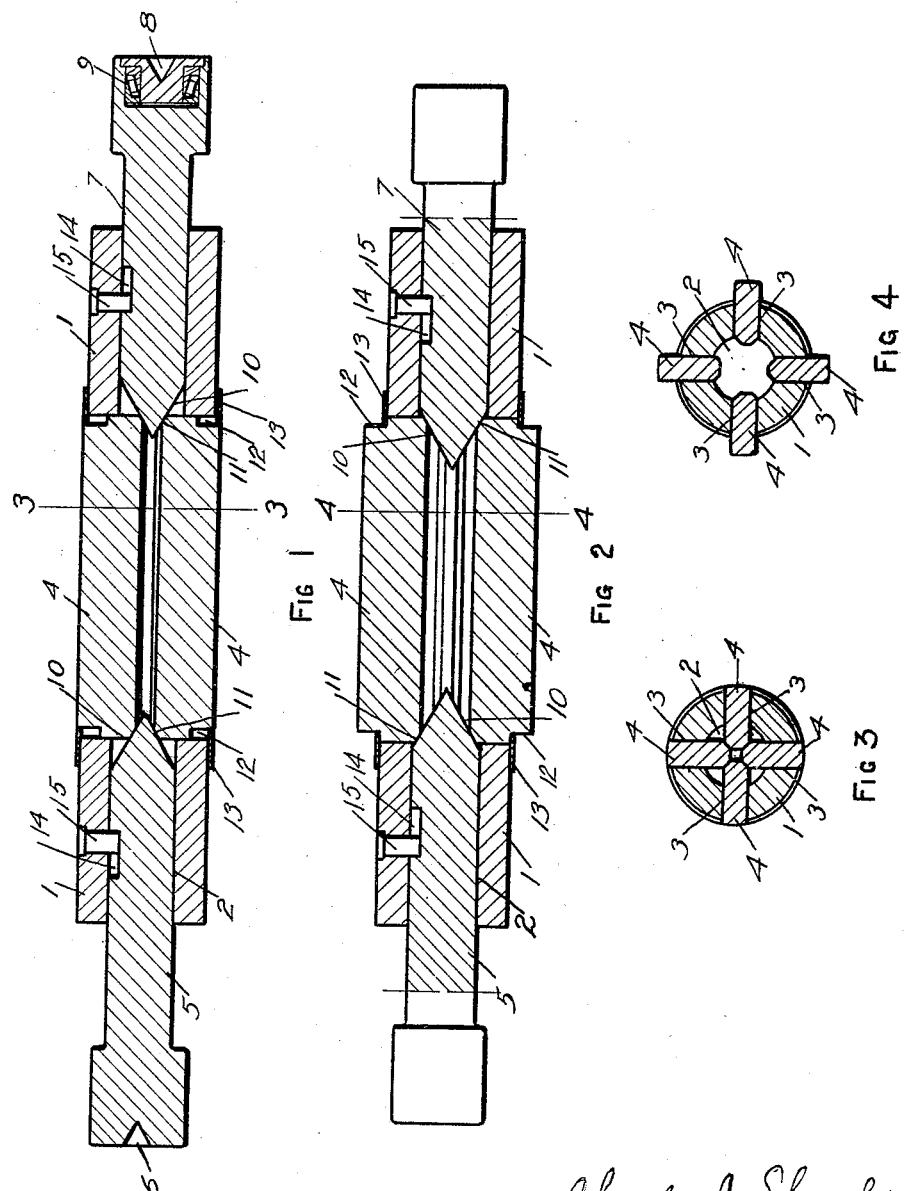
Charles J. Shenk
Inventor
Attorney Oct. 6, 1931.   C. J. SHENK   1,825,925
EXPANDING MANDREL
Filed March 29, 1929   2 Sheets-Sheet 2

Charles J. Shenk
INVENTOR.
BY
ATTORNEYS.

Patented Oct. 6, 1931

1,825,925

UNITED STATES PATENT OFFICE

CHARLES J. SHENK, OF WESTMINSTER, PENNSYLVANIA

EXPANDING MANDREL

Application filed March 29, 1929. Serial No. 351,073.

In the operation of lathes it is not uncommon to place the material having a bore on a mandrel. The commonest form of these mandrels is a solid mandrel of very slight taper on which the material is forced sufficiently to secure it. Another form has been used, commonly called an expanding mandrel which has adjusting blades which may be adjusted to different diameters. This whole structure is ordinarily adjusted before its insertion into the work and the work is driven, or forced onto the mandrel in the usual manner.

The present invention is directed to improving adjustable or expansion mandrels and is so formed that the expansion and tightening in the work is accomplished by the mere setting up of the mandrel in the lathe centers. Features and details of the invention will appear from the specification and claims.

Preferred embodiments of the invention are illustrated in the accompanying drawings as follows:—

Fig. 1 shows a central section of the mandrel with the expanding blades in collapsed position.

Fig. 2 a similar view with the blades expanded.

Fig. 3 a section on the line 3—3 in Fig. 1.

Fig. 4 a section on the line 4—4 in Fig. 2.

Figure 5:
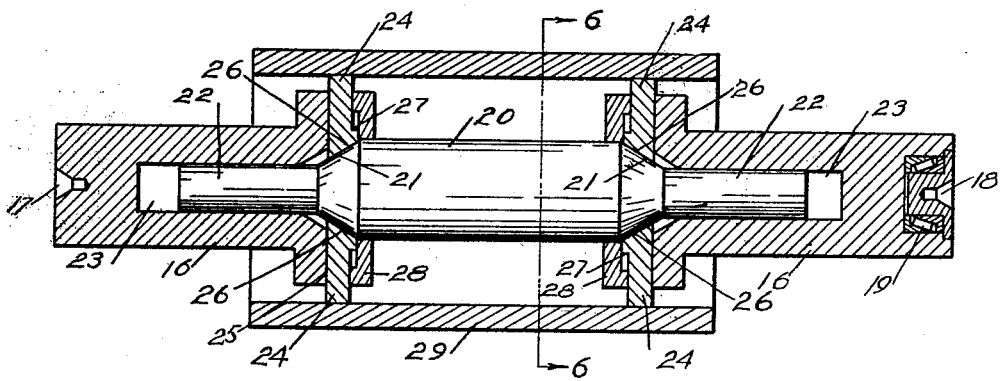
Figure 6:
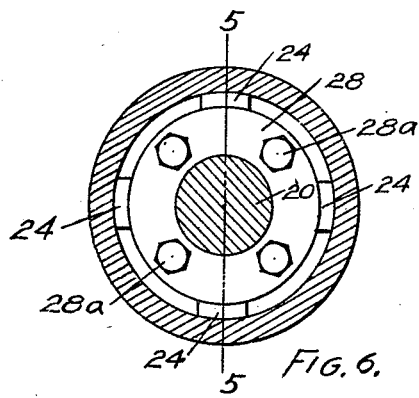

Fig. 5 a section on the line 5—5 in Fig. 6 showing an alternative construction.

Fig. 6 a section on the line 6—6 in Fig. 5.

Figure 7:
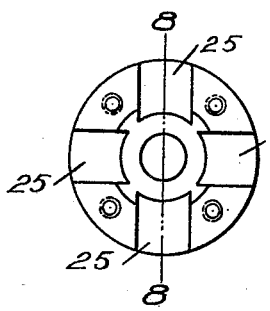

Fig. 7 an end view of one of the body portions.

Figure 8:
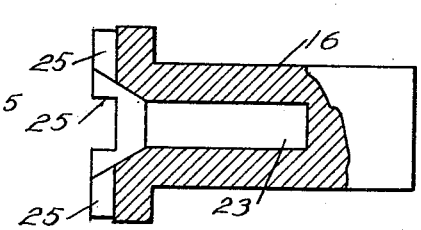

Fig. 8 a section on the line 8—8 in Fig. 7.

1 marks the expanding blade carrier. This has a central opening 2 extending through it. Radially extending slots 3 extend through the walls of the carrier and into the central opening. Expanding blades 4 are arranged in the slots 3. The carrier has telescoping end pieces 5 and 7, the end piece 5 having a centering socket 6 and the end piece 7 a centering socket 8. The centering socket 8 is preferably carried in an end piece provided with roller bearings 9.

The inner ends of the end pieces 5 and 7 are tapered at 10 and these ends engage small bevels 11 on the inner corners of the expanding plates.

In operation the mandrel is placed in the work, placed in the lathe and the tail piece set up. As the tail piece exerts pressure endwise on the carrier the plates are expanded through the tapered end pieces 5 and 7 engaging the inner walls of the work. If there is a slight taper in the bore of the work the blades automatically center and take up this variation. The roller bearing assures the proper rotative support at the tail piece even under considerable pressure.

In order to lock the blades against accidental removal from the slots I prefer to provide the blades with notches 12 at their ends and arrange retaining rings 13 on the body of the carrier. These rings may be slit over the notched portion of the blades.

In order to prevent accidental removal of the end pieces 5 and 7 these end pieces have notches 14 arranged therein and retaining pins 15 extend through the walls of the body into these notches. The notches are elongated so that the end pieces may have the necessary longitudinal movement to expand the blades for the proper operation of the mandrel.

In the alternative construction shown in Figs. 5 to 8 the carrier is formed of the end pieces 16. These end pieces have lathe centers 17 and 18, the lathe center 18 being carried by a plug with a roller bearing 19. A central expanding pin 20 has tapered surfaces 21 at each end and extensions 22 at each end, the extensions 22 projecting into openings 23 in the body end 16.

Expanding plates 24 are arranged in slots 25 extending radially in the carrier pieces 16. The lower ends of these blades are beveled at 26 to correspond to the tapers of the surfaces 21.

The faces of the plates are provided with shoulders at 27 and a retaining plate 28 is secured on the end of the carrier pieces 16 by set screws 28a. Work 29 is shown in place.

The operation of this device is quite similar to that of the structure shown in Figs. 1 to 4. The carrier as a whole is contractible and through the contraction of the carrier the expanding plates are expanded to engage the work. The carrier is placed in a lathe as in the preceding structure with the work in place thereon, the tail screw set up, thus contracting the carrier and with the contraction the tapered ends 21 operating on the expanding blades expand them into engagement with the work.

What I claim as new is:—

1. In an expanding mandrel, the combination of radially movable work supporting plates having work engaging surfaces on their peripheral edges; and an axially contractible carrier for the plates having radially extending guides in which the plates are slidably mounted and comprising tapered surfaces engaging the plates said carrier having centering ends and actuating the plates through the contraction of the carrier in response to pressure on the centering ends.

2. In an expanding mandrel, the combination of radially movable work supporting plates having work engaging surfaces on their peripheral edges; an axially contractible carrier for the plates having radially extending guides in which the plates are slidably mounted and comprising tapered surfaces engaging the plates said carrier having centering ends and actuating the plates through the contraction of the carrier in response to pressure on the centering ends; and means for retaining the plates in the carrier.

3. In an expanding mandrel, the combination of radially movable work supporting plates having work engaging surfaces on their peripheral edges; an axially contractible carrier comprising a body having a central opening and radial slots receiving the plates; and centering and supporting pins in the opening having tapered ends engaging the plates and actuating them with an inward movement of the pins in response to pressure on the pins.

4. In an expanding mandrel, the combination of radially movable work supporting plates having work engaging surfaces on their peripheral edges; an axially contractible carrier comprising a body having a central opening and radial slots receiving the plates; centering and supporting pins in the opening having tapered ends engaging the plates and actuating them with an inward movement of the pins in response to pressure on the pins; and means retaining the plates in the slots.

5. In an expanding mandrel, the combination of radially movable work supporting plates having work engaging surfaces on their peripheral edges; an axially contractible carrier comprising a body having a central opening and radial slots receiving the plates; centering and supporting pins in the opening having tapered ends engaging the plates and actuating them with an inward movement of the pins in response to pressure of the pins; and means retaining the pins in the opening.

In testimony whereof I have hereunto set my hand.

CHARLES J. SHENK.